United States Patent [19]
Rey

[11] Patent Number: 5,487,207
[45] Date of Patent: Jan. 30, 1996

[54] HINGE ELEMENT FOR A FOLDING SUPPORT

[76] Inventor: Henri Rey, 8 rue des Augustins, Colmar, France

[21] Appl. No.: 348,670

[22] PCT Filed: Aug. 4, 1987

[86] PCT No.: PCT/FR87/00304

§ 371 Date: Mar. 6, 1989

§ 102(e) Date: Mar. 6, 1989

[87] PCT Pub. No.: WO88/01676

PCT Pub. Date: Mar. 10, 1988

[30] Foreign Application Priority Data

Sep. 5, 1986 [FR] France .................................. 86 12584

[51] Int. Cl.[6] .................................................. E05D 11/10
[52] U.S. Cl. .................................................. 16/330; 182/152
[58] Field of Search .......................... 16/330, 349, 351; 182/152, 21, 22, 163

[56] References Cited

U.S. PATENT DOCUMENTS 1,328,874  1/1920  Henault .
4,363,561  12/1982  Hsieh .

FOREIGN PATENT DOCUMENTS 1275512  10/1961  France .................................. 403/97
2082571  12/1971  France .
2534307  4/1984  France .
2650006  5/1978  Germany .

Primary Examiner—Lowell A. Larson
Attorney, Agent, or Firm—Lane, Aitken & McCann

[57] ABSTRACT

The hinge element is comprised of two shells (10 and 11) made of dished metal plate which are assembled by means of a locking member comprising essentially a bolt (13) and a nut (15). Each of the two shells comprises a concave circular part having a flat bottom and an annular flange presenting undulated folds which are comprised of crests (19) and rounded hollows (20). The flange is generally interrupted at a mouthpiece (21, 24) to be fixed at one end of the longitudinal uprights of a folding support. Said hinge element is provided for assembling sections of a folding ladder or a scaffolding.

9 Claims, 2 Drawing Sheets

HINGE ELEMENT FOR A FOLDING SUPPORT

The present invention relates to a hinge element for a folding support provided with longitudinal uprights and cross pieces, particularly for scaffolding or a folding ladder, including two identical metallic shells each comprising a shaped tip, intended to be fixed at one end of an upright of the support, and a circular part made of dished metal plate provided with a bottom positioned transversely with respect to the hinge axis and a peripheral flange having mutual anchoring members with the other shell to make the two shells solidary in rotation around said axis, the element comprising in addition locking members arranged to press the two shells against one another axially so as to maintain in mutual engagement their anchoring members.

There is already known a hinge element of this type for a ladder by the document FR-A-2 534 307. In this known element, each of the shells comprises a peripheral flange which is positioned axially following a cylindrical shape. To be able to fasten on to the identical flange of the opposite shell, the flange comprises on its free edge a circular row of rectangular or trapezoidal teeth separated by hollows having the same profile as the teeth.

This type of shell has various disadvantages, particularly in shells made of dished metal plate, which obviously permits a much less expensive manufacture. As the teeth of the flange are cut in the edge of the metal plate, their support surfaces have a width equal to the thickness of the metal plate and are thus very small. Consequently, there are superficial pressures which can alter rather quickly the state of the metallic surfaces and particularly the protective coating which is generally provided. On the other hand, as said flange is interrupted in the area of the shaped tip, the meshing of the two flanges of the shells does not guarantee the reciprocal centering of the shells because the narrow teeth can easily disengage from one another by a small transverse displacement or a slight deformation. Finally, the rectangular or trapezoidal shape of the teeth is disadvantageous, because in usage the adjustment of the opening of the ladder and its locking into position require the user to insert the teeth of one of the hinge shells in the hollows of the other, which necessitates a certain amount of care given that the steadiness of the ladder depends on the precision of adjustment of the anchoring members of the two complementary elements. Furthermore, the repeated insertion of the edges of the teeth the hollows inevitably leads to wear and tear which the long run a looseness in the hinge.

The present invention proposes to overcome these different disadvantages by realizing a hinge composed of two identical shells made of dished metal plates which are designed to be adjusted into position with respect to one another and locked in the position selected without any difficulty. The anchoring members nest semi-automatically and there is no danger of looseness due to wear and tear following prolonged use of the hinge. In addition, the construction of this hinge element is very simple and its assembly is facilitated because of the fact that the two shells are identical.

These ends are attained by the hinge element according to the invention, characterized in that said flanges extend substantially radially with respect to the hinge axis, in that the metal plate of these flanges has a corrugated profile in the circumferential direction and in that this corrugated profile comprises rounded crests and rounded hollows, the crests having substantially the same profile as the hollows.

According to a preferred embodiment, each shell is constituted by a single piece of dished metal plate.

The corrugated profile of the flange is at least approximately sinusoidal.

According to a preferred embodiment, the circular part of each shell is concave on the side of the opposite shell and comprises a flat bottom, and the locking members comprise a bolt mounted axially through the two shells and a tightening nut, these members exerting an axial pressure on the bottom of the two shells.

To permit the positioning of the hinge element at the ends of the longitudinal uprights of the folding supports, the shaped tip is preferably constituted by a shaped section whose transverse section corresponds to those of said longitudinal uprights. This transverse section can be U-shaped or of a square, rectangular or circular shape.

The present invention likewise relates to a folding ladder, characterized in that it comprises at least two successive sections of which each upright is connected to the corresponding upright of the other section by a hinge element such as defined above. This ladder can comprise several sections hinged with respect to one another.

The present invention will be better understood by referring to the following description of an embodiment and annexed drawings, in which.

Figure 1:
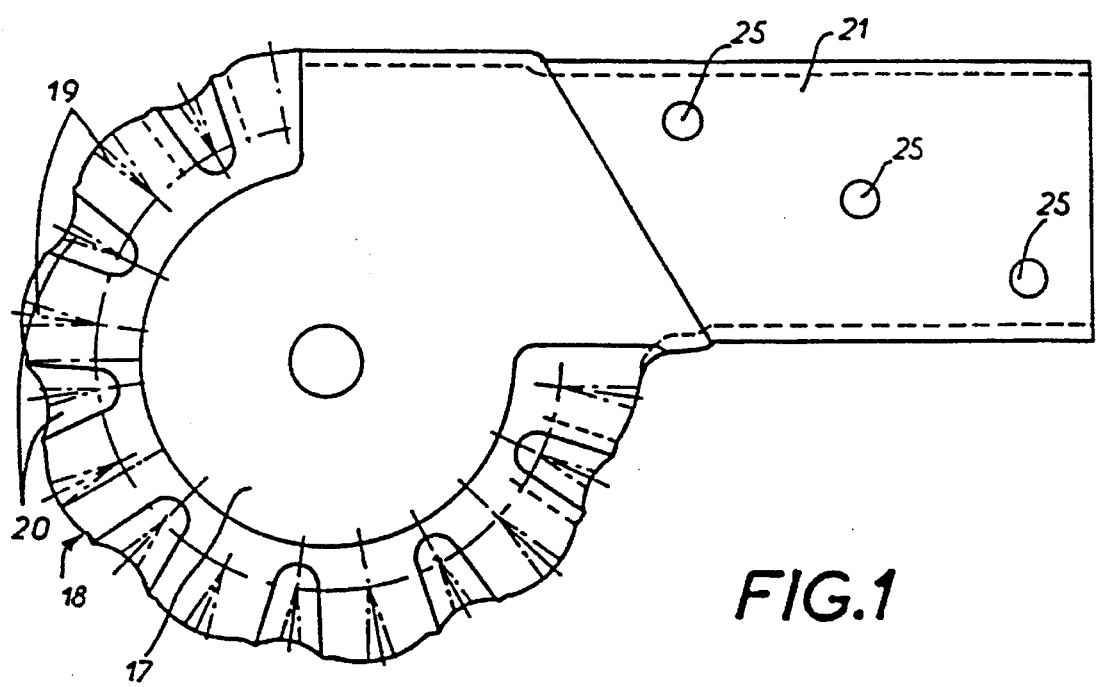
Fig. 1 shows a planar view of the hinge element according to the invention.
Figure 2:
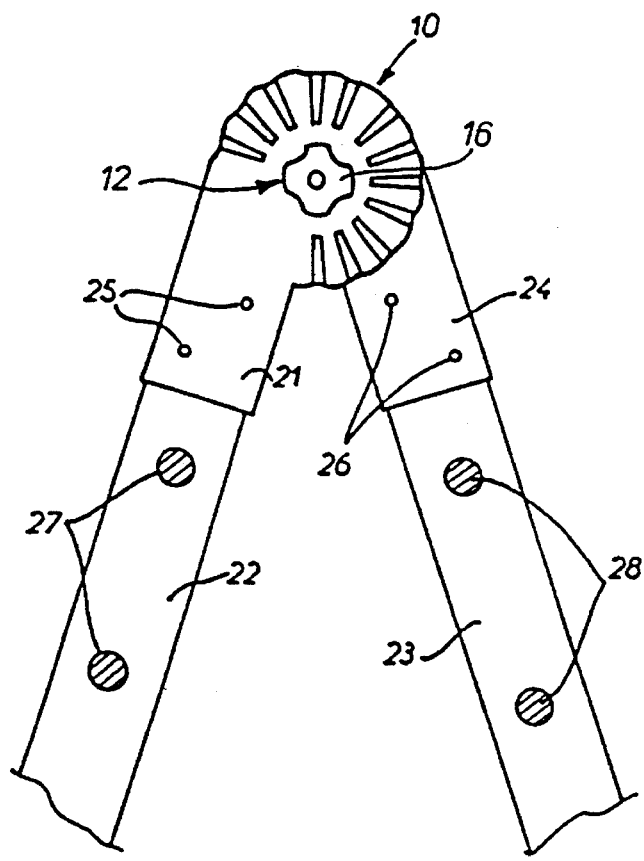
FIG. 2 shows a partial view in elevation of a hinge of a folding ladder or scaffolding realized by means of the hinge element according to the invention.
Figure 3:
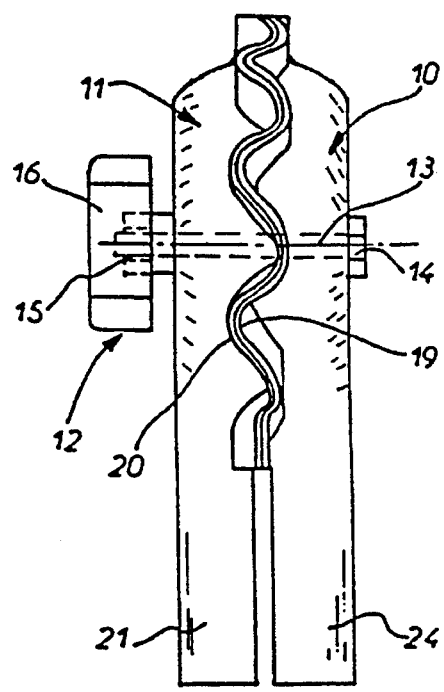
FIG. 3 shows a profile view of a hinge element according to the invention.

In reference to FIGS. 1–3, the hinge element used to assemble the sections of a folding ladder or scaffolding is composed of two identical shells 10 and 11 juxtaposed and maintained resting against one another by the locking members 12 preferably constituted by a bolt 13 having a square collar or a head 14 which can for example be welded to the shell 10, and by a nut 15 cast in a knob 16 made of synthetic material. Each of the shells is constituted of a concave circular part comprising a flat bottom 17 surrounded by an annular flange 18 formed of rounded folds whose crests 19 are separated by hollows 20 having substantially the same profile as the gaps. These folds have an almost sinusoidal shape, such that the crests of a shell can be lodged in the hollows of the adjacent shell, when two identical shells are assembled, as shown in FIGS. 2 and 3, to form a hinge element.

Figure 4:
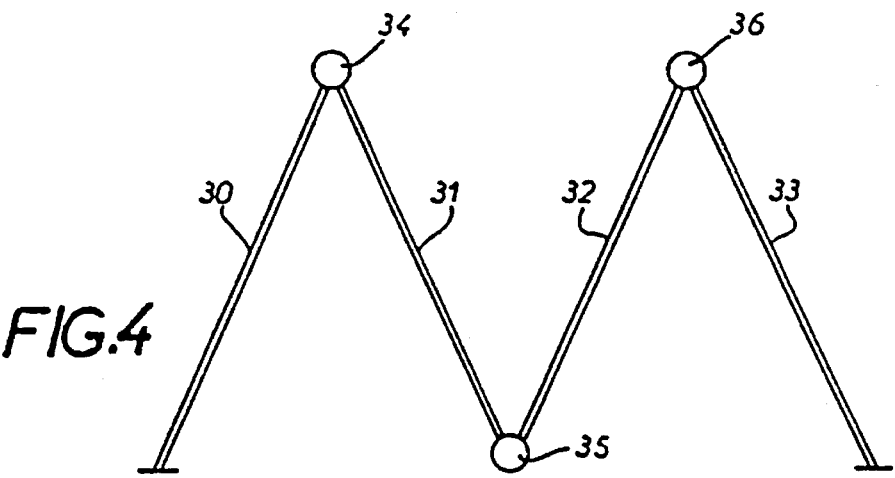
FIG. 4 shows a schematized view of a folding ladder or modular folding scaffolding comprising several sections assembled by means of hinge elements according to the invention.

The annular flange 18 is interrupted in a connecting area of a shaped tip 21 or 24 arranged to be fitted at one end of a longitudinal upright 22 or 23 for example of a folding ladder as partially shown by FIG. 4. The tips 21 or 24 have a transverse section whose shape is adapted to the transverse section of the longitudinal uprights 22 or 23. This section can be U-shaped, when the section of the uprights 22 or 23 is rectangular or square. The tips 21 and 24 can likewise have the shape of a tube section having a rectangular, square or circular section. The longitudinal uprights 22 and 23 are fixed respectively at the tips 21 and 24 by screws or bolts 25 and 26. Rungs 27 and 28 are mounted between two parallel uprights 22 or 23 of a folding ladder or a scaffolding element.

The hinge element described and shown has the advantage of being an extremely simple construction. In effect, this element can be implemented by simple dishing of a roughcast made of flat metal plate. The fact that the folds of the flange 18 have a rounded profile has the consequence that only the relative position of the two shells 10 and 11 shown by FIG. 3 is a stable position, all the other relative positions being unstable.

In fact, when the crests of one 0f the shells are brought to rest against the crests of the other shell or into whatever intermediate position between the crests and the hollows, the tightening by means of the bolt 13 and nut 15 automatically tends to make one of the shells turn with respect to the other to bring them into a position of stable equilibrium where the crests of one of the shells are lodged at the bottom of the hollows of the adjacent shell. Thus, one obtains an automatic centering which is done without any shearing stress on the linkage bolt. Furthermore, the corrugated profile of the flanges 18 guarantees a large support surface on each side in the opposite hollow, and this along the entire length of the overlapping arc of the two flanges. This shape also avoids any friction by the sharp edges during maneuvers, which ensures a long life for the shells, more particularly if the metal plate is galvanized.

To open up the angle formed by the uprights 22 and 23 of a folding ladder, it suffices to unscrew the nut 15 by means of the knob 16 until in a position where the two shells 10 and 11 can be sufficiently separated to freely turn with respect to one another. When the selected angular opening is attained, the user tightens up the nut 15 to lock the two shells in position with respect to one another. The nut and bolt locking device could be replaced by a locking system known in and of itself.

In a slightly different embodiment, one can provide for the corrugated profile of the flange to extend 360 degrees, i.e. also in the part of metal plate positioned between the concave part and the shaped tip 21, 24 of each shell. Thus one obtains preferably a hinge rotatable over 360 degrees, with two identical shells which are made entirely of dished metal plate and which are sufficiently rigid by virtue of the undulations extending between the concave part and the shaped tip.

FIG. 4 shows schematically a modular folding ladder comprising four ladder elements 30, 31, 32 and 33 respectively connected to one another by three pairs of hinge elements 34, 35 and 36. By virtue of this hinge element making it possible to easily render the uprights solidary with a folding support such as for example a step-ladder, a ladder, scaffolding, etc . . . , it is possible to envisage separate marketing of sections of such supports and hinge elements adapted to interlock these supports. As a result, each user will be able to implement his own folding support with respect to his needs or the envisaged use and more particularly lengthen a small ladder of two or four elements to realize a ladder having five, six or more elements and vice versa.

The present invention is not limited to the embodiments described but can be subject to different modifications and be presented in various alternatives obvious to someone with ordinary skill in the art.

I claim:

1. A hinge element for a folding support provided with longitudinal uprights and cross pieces, comprising two identical metallic shells each having a shaped tip adapted to be fixed at one end of-an upright of the support, a circular part made of a dished metal plate provided with a bottom positioned transversely with respect to the axis of the hinge, a wall extending generally transversely from said bottom, and a peripheral flange having an anchoring member for interengaging with the anchoring member of the other shell to render the two shells fixed with respect to rotation around said axis, the hinge element comprising in addition locking members arranged to press the two shells axially against one another in a manner so as to maintain their anchoring members in mutual engagement, wherein each of said flanges extends substantially radially with respect to the hinge axis, each said flange extends from said wall of said dished metal plate, the metal plate of each said flange has a corrugated profile in the circumferential direction, and the corrugated profile comprises rounded crests and rounded hollows, the crests having substantially the same profile as the hollows.

2. The hinge element according to claim 1, characterized in that the dished metal plate of each shell is a single part.

3. The hinge element according to claim 1, characterized in that said corrugated profile of the flange (20) is at least approximately sinusoidal.

4. The hinge element according to claim 1, characterized in that said circular part of each shell is concave on the side of the opposite shell and comprises a flat bottom (17).

5. The hinge element according to claim 4, characterized in that the locking members (12) comprise a bolt (13) mounted axially through the two shells (10, 11) and a tightening nut (15), the locking members exerting an axial pressure on the bottoms (17) of the two shells.

6. The hinge element according to claim 1, characterized in that the shaped tip (21, 24) is constituted by a shaped section having a U-shaped transverse section.

7. The hinge element according to claim 1, characterized in that the shaped tip (21, 24) is constituted by a tubular section having a transverse section with a square, rectangular or circular shape.

8. A folding ladder comprising at least two successive sections having uprights, each upright being connected to a corresponding upright of an adjacent section by a hinge element comprising two identical metallic shells each having a shaped tip adapted to be fixed at one end of an upright of the support, a circular part made of a dished metal plate provided with a bottom positioned transversely with respect to the axis of the hinge, a wall extending generally transversely from said bottom, and a peripheral flange having an anchoring member for interengaging with the anchoring member of the other shell to render the two shells fixed with respect to rotation around said axis, the hinge element comprising in addition locking members arranged to press the two shells axially against one another in a manner so as to maintain their anchoring members in mutual engagement, wherein each of said flanges extends substantially radially with respect to the hinge axis, each said flange extends from said wall of said dished metal plate, the metal plate of each said flange has a corrugated profile in the circumferential direction, and the corrugated profile comprises rounded crests and rounded hollows, the crests having substantially the same profile as the hollows.

9. A folding ladder according to claim 8, comprising at least three successive sections.

\* \* \* \* \*